(12) United States Patent
Wieser et al.

(10) Patent No.: US 7,484,920 B2
(45) Date of Patent: Feb. 3, 2009

(54) THREAD-FORMING SCREW

(75) Inventors: Juergen Wieser, Kaufering (DE); Johan Lennartsson, Malmö (SE); Pierre Hohmeier, Feldkirch (AT); Franz Huber, Markt Wald (DE)

(73) Assignee: Hilti Aktiengesellschaft, Scaasn (LI)

( * ) Notice: Subject to any disclaimer, the term of this patent is extended or adjusted under 35 U.S.C. 154(b) by 445 days.

(21) Appl. No.: 11/233,861

(22) Filed: Sep. 23, 2005

(65) Prior Publication Data
US 2006/0120826 A1  Jun. 8, 2006

(30) Foreign Application Priority Data
Nov. 8, 2004  (DE) ........................ 10 2004 053 803

(51) Int. Cl.
*F16B 25/10*  (2006.01)
(52) U.S. Cl. ................................. 411/387.4; 411/387.5
(58) Field of Classification Search .............. 411/387.4, 411/387.5, 387.8, 411, 308, 309, 310, 311, 411/416, 257; 470/8–10
See application file for complete search history.

(56) References Cited

U.S. PATENT DOCUMENTS

| 3,426,642 | A | * | 2/1969 | Phipard, Jr. ................. 411/417 |
| 3,680,646 | A | * | 8/1972 | Hughes et al. .............. 175/323 |
| 3,890,685 | A | * | 6/1975 | Runte et al. ................. 29/889 |
| 4,350,464 | A | * | 9/1982 | Brothers ..................... 411/180 |
| 4,385,669 | A | * | 5/1983 | Knutsen ..................... 175/323 |
| 4,842,467 | A | * | 6/1989 | Armstrong .................. 411/399 |
| 6,478,520 | B1 | * | 11/2002 | Sala .......................... 411/386 |
| 6,599,072 | B1 | * | 7/2003 | Gerhard .................... 411/387.4 |
| 7,160,073 | B2 | * | 1/2007 | Mizuno et al. ............ 411/387.4 |

FOREIGN PATENT DOCUMENTS

WO   WO 2004/074697   *   9/2004

\* cited by examiner

*Primary Examiner*—Gary Estremsky
(74) *Attorney, Agent, or Firm*—Abelman, Frayne & Schwab

(57) ABSTRACT

A thread-forming screw (11; 21; 31; 51), has a stem (12) with at least one thread (14; 24; 34; 54) arranged, at least region-wise, over its circumference, and a plurality of cutting elements (16; 26; 36; 56) arranged in a respective plurality of recesses (15; 25; 35; 55) formed in the at least one thread (14; 24; 34; 54), with the cutting elements (16; 26; 36; 56) having a hardness greater than a hardness of the at least one thread (14; 24; 34; 54) and formed as weld beads received in the recesses (15; 25; 35; 55).

10 Claims, 2 Drawing Sheets

THREAD-FORMING SCREW

BACKGROUND OF THE INVENTION

1. Field of the Invention

The present invention relates to a thread-forming screw, in particular, to a thread-forming screw produced of a corrosion-resistant metal and having a stem, at least one thread arranged, at least regionwise, over a circumference of the stem, and a plurality of cutting elements arranged in a respective plurality of recesses formed in the at least one thread, the cutting elements having a hardness greater than a hardness of the at least one thread.

2. Description of the Prior Art

Thread-forming screws of the type described above have a stem at one end of which, there is provided a head that serves as load application means. In thread-forming screws or thread-cutting screws, the outer thread has a high strength which permits to form a female thread in a constructional component. To this end, at least the steel of the outer thread is hardened. For external applications, the screws, such as concrete screws, are formed of corrosion-resistant steels. Such materials usually cannot have their strength increased by heat treatment to a sufficient degree that would insure a reliable formation of the female or inner thread in concrete.

German Publication DE 198 15 670 A1 discloses a thread-forming screw which is formed of a corrosion-resistant steel that is partially dispersion hardened.

The drawback of this screw consists in that the maximum achievable hardness is not sufficient for insertion of these screws in a hard mineral material, e.g., concrete.

International Publication WO 94/25764 discloses a thread-forming screw formed of a corrosion-resistant steel which is provided with a coating over its entire surface and which is formed by an ion-nitration process. The drawback of this screw consists in that the thickness of the coating is maximum 0.2 mm. When such screws are used in hard mineral materials, e.g., for insertion in constructional components formed of such materials, the coating is rubbed off already after several revolutions of the screw.

German Publication DE 198 52 338 A1 discloses a screw formed of a stainless steel and the thread of which is provided with bores for receiving pin-shaped cutting inserts formed of a hardened steel and which provide for thread-cutting in constructional components formed of hard mineral materials. The drawback of the above-described screw consists in that the manufacturing of these screws is very expensive because a plurality of pin-shaped cutting inserts should be driven into the receiving bores. At both ends of the pin-shaped cutting insert, there is provided, respectively, a cutting head to be able to drive the cutting inserts into the receiving bores in both directions. After the pin-shaped cutting inserts are driven into the receiving bores, the cutting heads, which project above the bores, should be ground. In the radial direction, the pin-shaped cutting inserts are held in the receiving bores only by friction.

International Publication WO 2004/074697 A1 discloses a thread-forming screw having a stem formed of a material with a carbon content between 0% and 0.5% by weight and with a thread formed integrally with the stem. In the thread, there is embodied a cutting element that is formed as a weld body of a metal with a carbon content of more than 0.8% by weight and which is fixedly connected with the stem. The weld body is formed of a high-speed steel and is welded into the thread. The drawback of this screw consists in that it is too costly to weld into a thread separate weld bodies. In addition, a steel with a carbon content of above 0.8% by weight, so-called hyper-eutectoid steel, has a poor weldability, so that with securing the cutting element in the thread, a not unsubstantial region of the thread and of the core are weakened during the welding process, which can result in formation of fissures in this region.

Accordingly, an object of the present invention is a thread-forming screw in which the drawbacks of the known thread-forming screws are eliminated.

Another object of the present invention is a thread-forming screw capable of cutting a thread in constructional components formed of a hard material, e.g., such as concrete.

SUMMARY OF THE INVENTION

These and other objects of the present invention, which will become apparent hereinafter, are achieved by forming the cutting elements as weld beads which are arrangeable in the recesses formed in the thread.

In the preliminary formed recesses, the weld beads can be formed in the thread with a carbon content sufficient for retaining their cutting capability. The possibility to form the weld beads with a desired carbon content leads to a better welding process and to a smaller tension between the base material and the weld deposits. The reduction of thermal stresses of the base material during formation of the weld beads provides for retention of the corrosion resistance of the base material to a most possible extent. Also, the formation of weld beads of a filler material permits to obtain more precise profile geometries with a finely defined geometry, which permits to obtain an advantageous cutting behavior in a mineral constructional materials, e.g., concrete. In addition, an expensive mechanical treatment of the produced cutting elements can be eliminated. The produced cutting elements can be formed as a part of the thread or project radially beyond the thread. Upon arrangement of several cutting elements along the course of the thread, the cutting elements, which are arranged adjacent to the setting direction end of the stem, can be so arranged that they project radially beyond the thread, with their radial extent being continuously reduced until it corresponds to the radial extent of the thread. According to an advantageous embodiment of the inventive, thread-forming screw, only in the region starting from the setting direction end of the stem, there can be provided from 4 to 15 spaced from each other, cutting elements.

Advantageously, the weld beads have a carbon content of less than 0.8% by weight. This content improves the weldability, and provides for an easy manufacturing and a satisfactory connection between the weld beads and the base material of the screw. The arrangement of the weld beads in the recesses causes only an insignificant melting of the base material of the screw. Thereby, the final product with the required profile geometry has a high hardness and, therefore, a better retention of its cutting ability than the prior art screws with weld inserts having a high carbon content and which are not arranged in the recesses. The tension between the base material and the cutting inserts, which are formed as weld beads having a small carbon content, is noticeably reduced.

Advantageously, the recesses for receiving the weld beads are formed as point recesses the extent of which in the direction of the thread course at most corresponds to a double of radial extent of the thread. Thereby, a sufficient contact surface for arrangement of the weld bead in the screw thread is available with respect to the amount of the fed filler material or the size of the weld bead. Therefore, only a very insignificant melting of the base material of the screw takes place.

According to an alternative embodiment of an inventive screw, the recesses for receiving the weld beads are formed as linear recesses a minimal extent of which in the direction of the thread course corresponds at least to a double of the radial extent of the thread. Thereby, there can be arranged, in the recesses, cutting elements having a large operational surface with respect to a constructional component upon setting of a screw in. In this embodiment likewise, a sufficient, with respect to the weld bead, contact surface for securing the weld bead is available, and only a small melting of the base material of the screw is insured.

Advantageously, the recesses have a bottom spaced radially from the outer circumference of the stem. Preferably, the bottoms of the recesses are spaced from the stem outer circumference by a distance such that upon formation of the weld beads, only the material of the thread, which is provided on the stem, is subjected to melting. Therefore, the stem itself at most is subjected to minimal heat stresses. The corrosion resistance of the screw stem is retained to a most possible extent.

Advantageously, the distance between the recesses increases along the course of the thread, starting from the setting direction end of the stem. In the front region of the thread which first engages the constructional component upon the setting of the thread-forming screw, the cutting elements are arranged close to each other. In the section of the thread remote from the stem setting direction end, the cutting elements can be spaced from each other by a greater distance. This is because the farther arranged cutting elements perform only a finishing operation and simply serve for improving the process of setting a screw in a constructional component.

Advantageously, for positioning of the cutting elements, there are provided, in the recesses, positioning elements. The positioning elements are formed as adhesion-stimulating elements and are provided, in accordance with a desired position of the cutting elements in the bottom and/or on a wall of respective recesses. The weld beads are held, during formation of the cutting elements, in desired positions by the positioning elements which facilitate formation of a predetermined shape of the cutting elements, e.g., when the cutting elements have a shape of an ovaloid or a drop. Advantageously, the precisely defined cutting elements project radially and/or axially beyond the outer sides of the thread, which improves the thread-forming process.

The positioning elements prevent an undesired displacement of the weld beads, e.g., their engagement with the walls of the recesses. According to a preferable embodiment of the invention, the positioning elements are formed as projections which, e.g., are formed during formation of the recesses in the thread by milling. Alternatively, depressions can be used as positioning elements for positioning the weld beads in the recesses. The depression can be formed as grooves. Furthermore, the positioning elements can be formed by roughening a section of a recess, e.g., by providing flutes or knurles in the recess. Next to a mechanical treatment of a recess, a chemical treatment is also feasible, e.g., using etching for removing some material of the recess for forming a positioning element.

Preferably, the recesses are provided with walls, with the weld beads being spaced from at least one wall of the respective recesses. Thereby, a free space is provided for removal of a to-be-cut material, which improves the thread-forming process, whereby the setting process of the inventive screw is facilitated. According to an advantageous embodiment of the inventive screw, the weld beads are arranged on bottoms of the respective recesses and are spaced of both side walls of the recesses. This freestanding arrangement of the cutting elements in the recesses in combination, e.g., with an ovaloid shape of the cutting elements, provides for an advantageous cutting behavior or thread-forming process and, thus, for better setting behavior. Thereby, on one hand, the setting time is reduced and, on the other hand, a smaller torque is needed for setting an inventive screw in comparison with that required for setting a conventional thread-forming screw. This contributes to the economy of the inventive screw.

For forming an inventive screw, at least one thread is arranged, at least regionwise, over the stem circumference. Then, in accordance with the requirement, point or linear recesses are formed in the thread, and weld beads, which form the cutting elements, are formed in the recesses.

Advantageously, the weld beads in the thread are formed by laser welding, which provides for a simple and cost-effective manufacturing of the inventive screw. The laser welding insures that smaller zones are influenced by heating than with other welding processes. Thereby, the degree of melting of the core and/or thread material, which is important for maintaining the corrosion resistance of the material is reduced. Also, the laser welding reduces intermixing of hardnesses of the core material and the weld beads, so that the resulting hardness of the cutting elements, which was selected by using an appropriate filler material, is retained to the most possible extent.

The cutting elements are produced using a predetermined welding program with which the shape and the position of the cutting elements in the recesses can be easily determined. The welded cutting elements do not require any secondary treatment, e.g., grinding, so that the edge hardness of the edge layer is retained and is available for effecting a thread-forming process. The laser welding reduces manufacturing costs of production of the inventive screw.

E.g., in order to provide a first point on the recess bottom, e.g., in the region of the positioning element for positioning of a cutting element, a weld pool is formed, and then the filler material is fed into the pool and is slightly cooled. During an upward movement of the laser welding head, a portion of the filler material is fed again, and a second weld point is formed over the not yet solidified first weld point. With this process, intermixing between the cutting element and the core material of the screw is significantly reduced. Thereby, a sufficient hardness of the cutting element, together with retention of the corrosion resistance of the screw, is obtained.

According to an alternative embodiment of the inventive screw, the weld bead is alloyed up. In particular, with an embodiment of recesses in which the bottoms of the recesses do not reach the core, the walls of the recesses can be melted locally or in zones, while insuring that the corrosion resistance does not change. In addition, alloyed materials, such as, e.g., hardenable steels, carbon, or the like alloyed powder used for increasing hardness of metals, can be added. This permits to obtain a greater hardness and, thus, to retain the screw cutting ability.

The novel features of the present invention, which are considered as characteristic for the invention, are set forth in the appended claims. The invention itself, however, both as to its construction and its mode of operation, together with additional advantages and objects thereof, will be best understood from the following detailed description of preferred embodiments, when read with reference to the accompanying drawings.

DETAILED DESCRIPTION OF THE INVENTION

Figure 1:
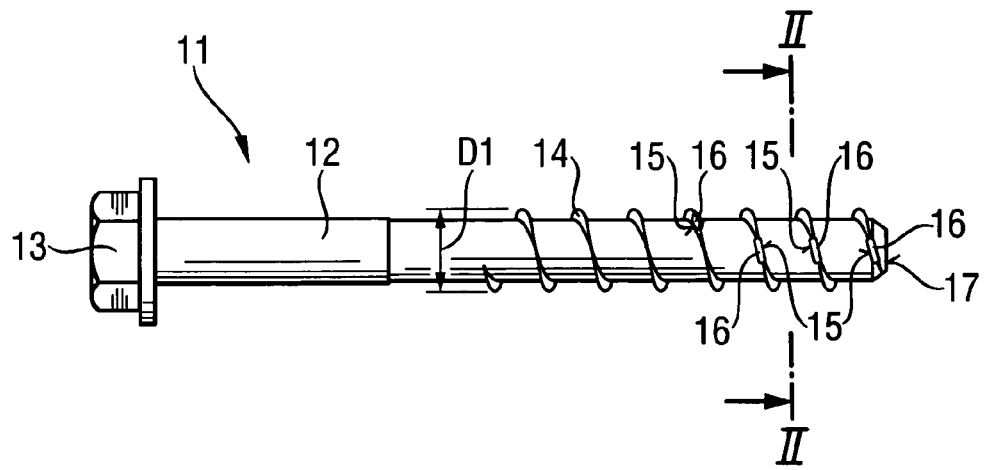
FIG. 1 a side view of a thread-forming screw according to the present invention.
Figure 2:
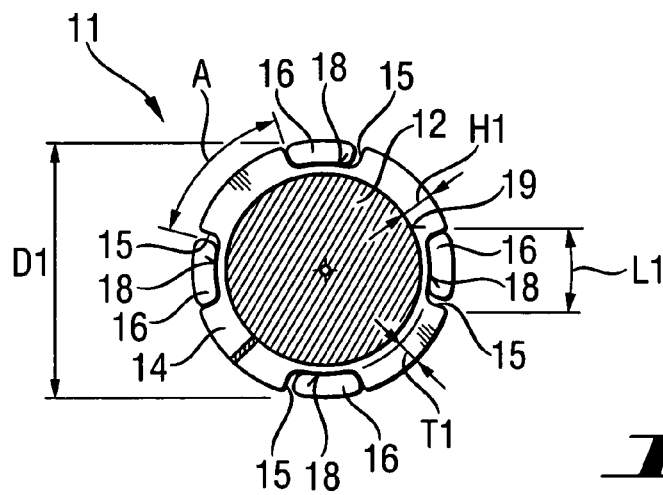
FIG. 2 a cross-sectional view along line II-II in FIG. 1.

A corrosion-resistant, thread-forming screw 11 according to the present invention, which is shown in FIGS. 1-2, is formed of a base material containing, by weight, less than 0.5% of carbon, e.g., containing 0.1% of carbon, and has a stem 12, a screw head 13 provided at one end of the stem 12, and a thread 14 provided regionwise on the circumference of the stem 12. On the thread 14, there are formed a plurality of recesses 15 which are formed as linear recesses and in which weld beads are alloyed up to form cutting elements 16. The weld beads have a carbon content, by weight, of less than 0.8%, e.g., a carbon content of 0.7%. The angular distance A of the recesses 15 from each other and, thus, of the cutting elements 16 from each other along the course of the thread 14 increases, staring from the setting direction end 17 of the stem 12. The recesses 15 have a longitudinal extent L1 in the direction of the course of the thread 14 that corresponds to a triple of a radial extent H1 of the thread 14. The recesses 15 have a depth T1 in the radial direction of the stem 12 and which is smaller than the radial extent H1 of the thread 14. Therefore, the bottom 18 of the recesses 15 is spaced from the circumference 19 of the stem 12. The cutting elements 16 reach, in the radial direction, up to the outer circumference .e.g., up to the outer diameter 21 of the thread 14.

As a result of the arrangement of weld beads in the recesses 15, the produced cutting elements 16 have a hardness greater than 600 HV, while the screw 11 itself has a hardness from 150 HV up to 400 HV. This insures a satisfactory retention of cutting capability of the screw 11 even upon setting of the same, e.g., in concrete.

Figure 3:
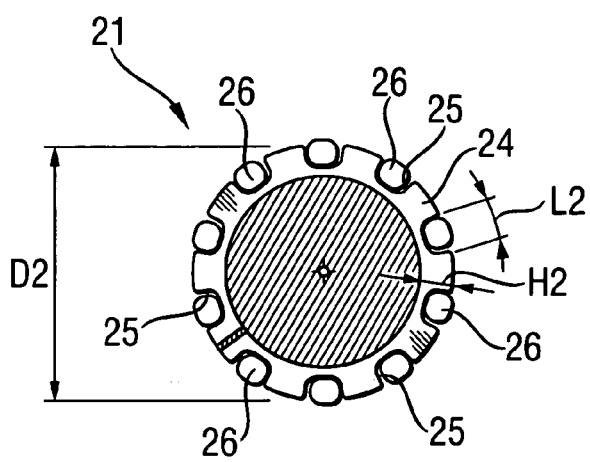
FIG. 3 a cross-sectional view similar to that of FIG. 2 of another embodiment of a thread-forming screw according to the present invention.

A screw 21 according to the present invention, a cross-section of which is shown in FIG. 3, has, as the screw 11 shown in FIGS. 1-2, recesses 25 for receiving weld beads that form cutting elements 26. In the embodiment shown in FIG. 3, the recesses 25 are formed as point recesses, and the weld beads are welded therein. The cutting elements 26 extend in the radial direction beyond the outer circumference or beyond the outer diameter 22 of the thread 24, projecting beyond the thread 24. In the direction of the course of the tread 24, the recesses 25 have a longitudinal extent L2 corresponding to the radial extent H2 of the thread 24.

Figure 4:
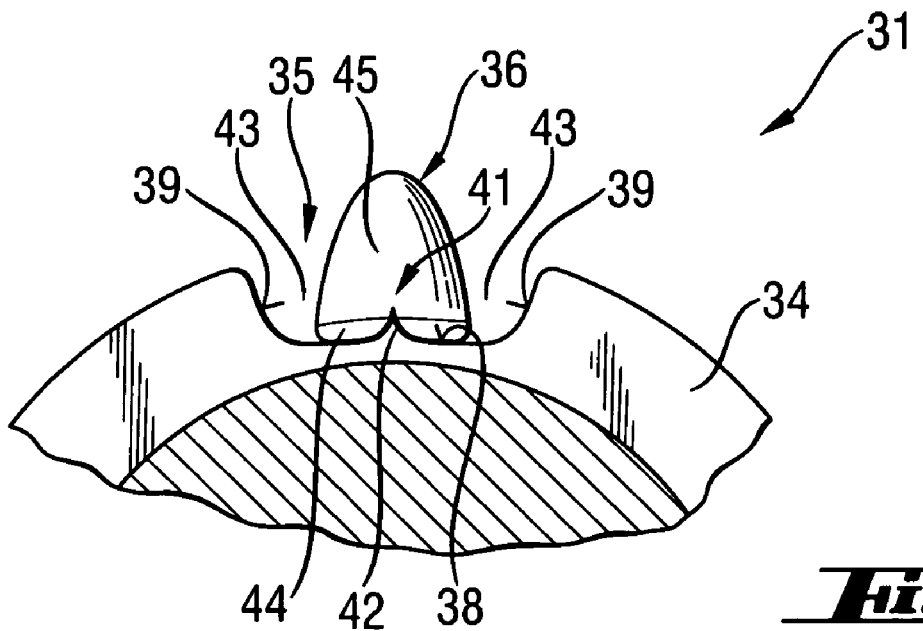
FIG. 4 a view of a detail of a cross-section of a thread-forming screw according to the present invention with a cutting element arranged in a recess formed in the body of the screw.

A screw 31 according to the present invention, a detail of a cross-section of which is shown in FIG. 4, has cutting elements 36 having a shape of an ovaloid and which are formed in the recesses 35 of the thread 34 by a laser welding. For positioning of the cutting element 36 which is formed as a weld bead, in the recess 35, there is provided, in the bottom section 38, a projection 42 forming a positioning element 41. In order to provide free space 43 for removing of the material produced during cutting, the cutting element 36 is spaced from opposite walls 39 of the recess 35.

For producing the thread-forming screw 31, e.g., with a milling tool, recesses 35 are formed in the thread 34, with simultaneous formation of the respective projections 42. Then, with a laser welding apparatus, a weld pool is formed in each recess 35 which is filled with the filler material and, by light cooling, a first weld point 44 is formed. During upward movement of the welding head, another portion of the filler material is fed into the weld pool, and a second weld point 45 is formed over of the not yet solidified, first weld point 44.

Figure 5:
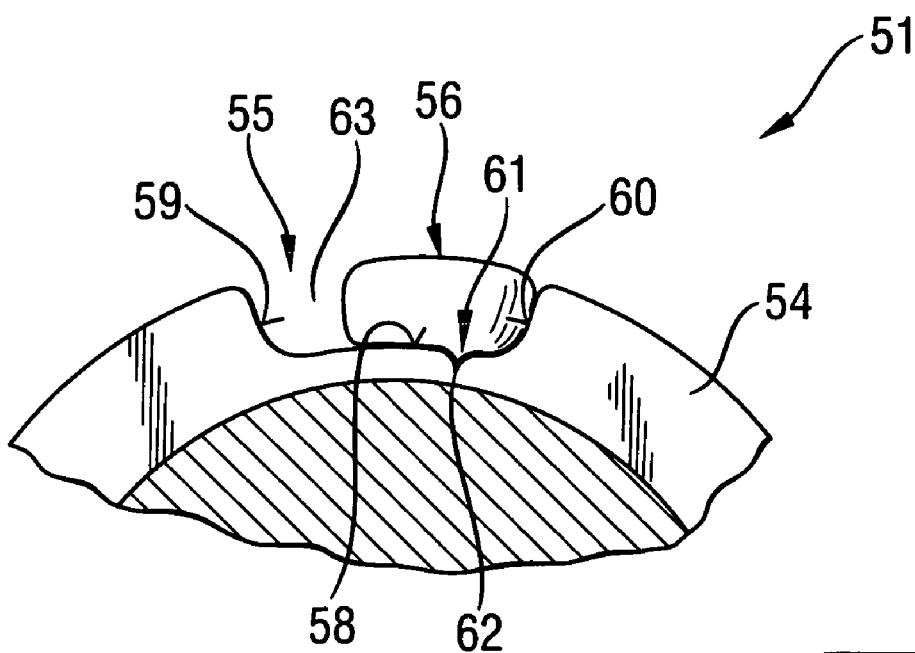
FIG. 5 a view of a detail of a cross-section of another embodiment of a thread-forming screw according to the present invention with a cutting element arranged in a recess formed in the body of the screw.

FIG. 5 shows a detail of a cross-section of another embodiment of a thread-forming screw, screw 51, according to the present invention. In the screw 51, in the bottom 58 of a recess 55, which is formed in the thread 54, a groove 62 that serves as a positioning element 51, is formed. The positioning element 51 provides for a surface increase and serves for holding the cutting element 56 in a predetermined position in the recess 55. In the embodiment of the inventive thread-forming screw 51 shown in FIG. 5, the cutting element 56 bears against one of the walls of the recess 55, and is spaced from another wall 59 to provide a free space 63.

Though the present invention was shown and described with references to the preferred embodiments, such are merely illustrative of the present invention and are not to be construed as a limitation thereof, and various modifications of the present invention will be apparent to those skilled in the art. It is, therefore, not intended that the present invention be limited to the disclosed embodiments or details thereof, and the present invention includes all variations and/or alternative embodiments within the spirit and scope of the present invention as defined by the appended claims.

What is claimed is:

1. A thread-forming screw (11; 21; 31; 51) comprising a stem (12); at least one thread (14; 24; 34; 54) arranged, at least regionwise, over a circumference of the stem (12); and a plurality of cutting elements (16; 26; 36; 56) arranged in a respective plurality of recesses (15; 25; 35; 55) formed in the at least one thread (14; 24;34;54), the cutting elements (16; 26; 36; 56) having a hardness greater than a hardness of the at least one thread (14; 24; 34; 54) and being formed as weld beads formed in the recesses (15;25; 35; 55) of a filler material.

2. A thread-forming screw according to claim 1, wherein the weld beads have a carbon content of less than 0.8% by weight.

3. A thread-forming screw according to claim 1, wherein the recesses (25) for receiving the weld beads are formed as point recesses an extent of each of which in a direction of the thread course corresponds at most to a double of a radial extent of the thread.

4. A thread-forming screw according to claim 1, wherein the recesses (15; 35; 55) for receiving the weld beads are formed as linear recesses an extent of each of which in a direction of the thread course corresponds at least to a double of a radial extent of the thread.

5. A thread-forming screw according to claim 1, wherein the recesses (15; 25; 35; 55) have a bottom (18; 38; 58) radially spaced from an outer circumference (19) of the stem (12).

6. A thread forming screw according to claim 1, wherein a distance (A) of the recesses (15) from each other along a course of the at least one thread (14) increases, starting from a setting direction end (17) of the stem (12).

7. A thread-forming screw according to claim 1, wherein in at least one of bottom and wall of each recess (35; 55), there is provided a positioning element (41; 61) for positioning a cutting element (36; 56) therein.

8. A thread-forming screw according to claim 7, wherein the positioning element (41) is formed as a projection (42).

9. A thread-forming screw according to claim 1, wherein the recesses (15; 25; 35; 55) have walls (39; 59; 60), and wherein the cutting elements (16; 26; 36; 56) are spaced, respectively, from at least one of the walls (39; 59).

10. A method of forming a thread-forming screw (11; 21; 31; 51) having a stem (12); at least one thread (14; 24; 34; 54) arranged, at least regionwise, over a circumference of the stem (12); and a plurality of cutting elements (16; 26; 36 56) arranged in a respective plurality of recesses (15; 25; 35; 55) formed in the at least one thread (14; 24; 34; 54), the cutting elements (16; 26; 36; 56) having a hardness greater than a hardness of the at least one thread (14; 24; 34; 54) and being formed as weld beads received in the recesses (15; 25; 35; 55), the method comprising the steps of forming a screw (11; 21; 31; 51) with at least one thread (14; 24; 34; 54) arranged, at least regionwise, over a circumference of the screw stem (12); forming the plurality of recesses (15; 25; 35; 55) in the thread (14; 24; 34 54); and thereafter, forming, in the recesses (15; 25; 35; 55), cutting elements-forming weld beads of a filler material by laser welding.

\* \* \* \* \*